Sept. 15, 1936.   E. REICH   2,054,714
COOKING EQUIPMENT
Filed Jan. 30, 1935
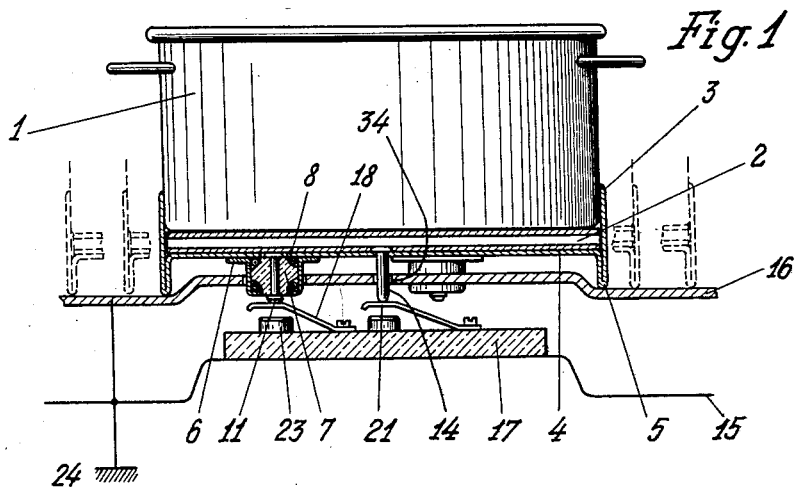
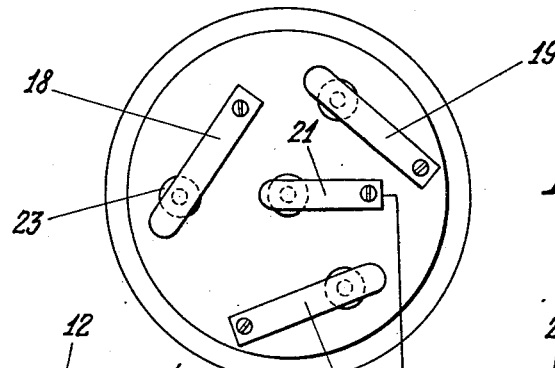
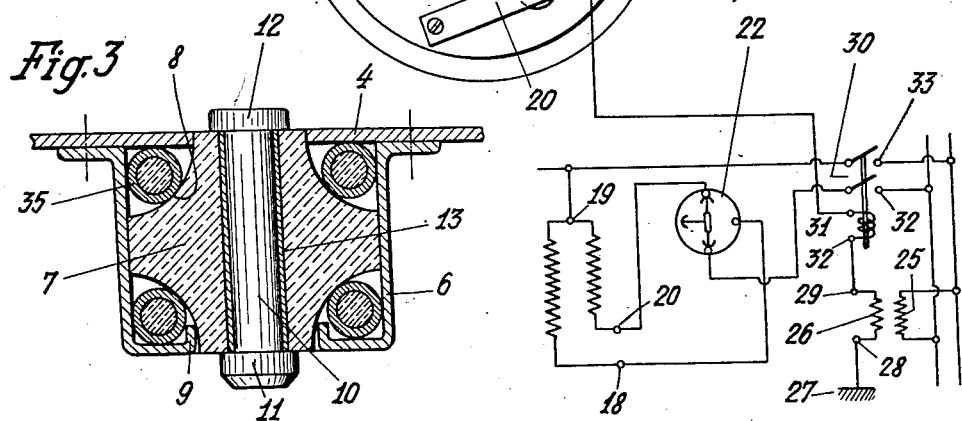
Inventor:—
Ernest Reich Patented Sept. 15, 1936

2,054,714

UNITED STATES PATENT OFFICE 2,054,714

COOKING EQUIPMENT

Ernest Reich, Budapest, Hungary

Application January 30, 1935, Serial No. 4,192
In Hungary February 6, 1934

7 Claims. (Cl. 219—44)

It is a drawback of the cooking vessels fitted with direct electric heating as employed up to now, that the introduction of the current was effected by means of a connecting cord, and that it was not possible to provide in a manner ensuring full safety of service, for the control of current during cooking, i. e. for the gradual switching on and switching off of the current. A further drawback of these devices consists in that their cleaning or moving about required particular care, because they were not tight against leakage, for which reason the vessel was liable to suffer damage in case any water came in contact with the electric heater.

The connecting cord was, particularly in the case of the simultaneous use of a number of cooking vessels, liable to get in the way of the operator and was also easily liable to become damaged; body faults which may have developed owing to the conductor becoming bare at such an occasion or owing to some other reason, have meant danger to the life of the operator.

Finally, it should also be considered a drawback of the direct-heated cooking vessels employed up to now, that it was not possible for the power supply companies to supply current for such devices at a reduced tariff, because the connecting members of the cooking vessels made it possible that other current-consuming devices not entitled to such a reduction, as lamps, motors, etc. should be connected to the same place of connection thus abusing of the privilege granted to the cooking devices.

In order to eliminate these drawbacks it has been proposed to arrange the current feeding contacts of the cooking vessel in a separate base from which the cooking vessel with its contents could be removed.

The disadvantage of such an arrangement is that the base could remain under tension even after removal of the vessel, as a result of which, and especially due to physical contact which might result from the liquid during cooking, the device might be a constant source of extreme danger for the operator.

This drawback is eliminated, according to the present invention, by providing a safety interrupting member in the circuit of the contacts feeding the current into the cooking vessel, as a result of which the vessel is retained in its operating position when under tension, while the tension is removed when the vessel is in its inoperative position, i. e. is removed from its base.

This safety interrupter consists, in a preferred embodiment of the invention, of a remote control switch (magnet switch) rendering the current feeding contacts of the cooking vessel devoid of tension when the vessel does not cover said contacts.

This feature is very important because in a kitchen it is absolutely necessary to prevent the possibility of anyone touching any metal parts under tension.

Besides, it is also ensured by the invention, that in case the cooking vessel develops a body fault and thus becomes dangerous, the body of the cooking vessel should be immediately earthed, and that thus the body fault should no longer be able to cause any danger.

In general, the purpose of the invention is to provide that degree of safety in connection with direct-heated vessels, which it has up to now been impossible to provide in the case of vessels with plug-cord connection, chiefly for the reason, because in the case of these last-named vessels, any faulty or otherwise normal plug socket has been liable to cause danger to life in the case of an erroneous exchange of the cords or plugs, such danger having been due either to the ceasing of the earthing or to a body fault of the vessel.

The enclosed drawing illustrates an embodiment of the invention shown by way of example.

Fig. 1 is an elevation partly in section of the cooking equipment.

Fig. 2 is a plan view of the insulating body and of the connection contacts of the cooking equipment and a diagram of connections of the protecting devices and of the whole equipment.

Fig. 3 is a detailed drawing, drawn to a larger scale.

1 is the cylindrical cooking vessel (Fig. 1) to the bottom of which the electric heater 2 is fixed. A flange 3 is shrunk, soldered or attached on the cooking vessel 1. The flange 3 is fitted with flanged bottom 4 arranged below the heater 2, the flange 5 of which bottom is soldered or welded to the flange 3.

The current-introducing conductors of the heater are rendered tight against any leakage in the following manner:

On the bottom 4 a number of bushes 6 fitted with bases, for instance three such bushes, are welded, into which bushes the through insulators 7 are pressed (Fig. 3). On the rim 8 of the insulators copper rings 35 stuffed with asbestos are arranged. The end 9 of the bush 6 is flanged so that the bolt 10 passing through the insulator 7 is insulated from the bush 6. The bolt 10 passing through the insulator 7 is jammed hot into the through insulator 7. Tightness is ensured partly by the fact that the heads 11, 12 of the bolt are fitting closely on the insulator and partly by filling the gaps around the cylindrical part of the bolt by an adhesive compound 13 resistant to heat.

Current connection is provided for vessel 1 (Fig. 1) by placing it on the tiltable lid 16 of the table 15 in which case the head 11 of the bolt 10 passing through the insulator 7 will abut against the flexible contacts 18, 19, 20 fixed on the insulator body 17 arranged on the table 15. In the operative position the flange 3 is supported on the lid 16 of the table. Accordingly, it is not necessary during cooking, to get hold of the vessel when stirring the food contained in it, because any tilting or displacement of the vessel 1 is prevented by the fact that the flange 3 is completely supported as well as by the bolt 14.

The gradual putting in circuit of the heater arranged in the cooking vessel 1 is effected by the switch for gradual switching on 22 arranged on the table in a known manner.

Stops 23 are preventing the resilient contacts 18, 19, 20 from being deformed by any violent tampering with the apparatus, and accordingly the resiliency of these contacts will be maintained.

The table 15 of the cooking equipment is earthed by the plate 24 so that it is not dangerous to touch the vessel 1 even though a body fault should develop on it.

The following equipment is employed for ensuring that touching the vessel should be perfectly safe:

Into the bottom 4 there is fixed the pin 14, which latter in the operative position of the vessel is supported on the contact 21. The contact 21 joins on to the terminal 31 of the low-tension, preferably 24 volt, pulling-in coil of the magnet switch 30 shown on Fig. 2, whilst the terminal 32 of the pulling-in coil is connected to the terminal 29 of the secondary coil 26 of the low-tension transformer 25. The terminal 28 of the secondary coil 26 is earthed through plate 27. In view of the fact that the contact 21 is insulated from the table 15, the connecting contacts 18, 20 can receive any tension only if a conducting contact is established between the contact 21 and the earthed table 15.

This is effected by the vessel 1 in such a manner that its flange 3 is reposing on the lid 16 and thus the circuit of the secondary coil 26 is the following:

From the earthing plate 27 through 28, 26, 29, 32, 31 to contact 21, and following this through the pin 14 and flange 3 through the lid of table 15 and then through the earthing plate 24 and through the earth back to the earthing plate 27.

The magnet switch 30 can accordingly be in circuit only if the vessel 1 closes the above circuit. If the vessel is lifted off the table, the magnet switch 30 will bipolarly open the terminals 32, 33 and thereby the contacts 18, 20 will become devoid of any tension. In view of the fact that the circuit of the secondary coil 26 is closed through the earthing plates 24, 27 it does not need any further explanation that no disconnection will be effected by the magnet switch 30 either in the case of the resistance of the earth increasing above a certain figure or in case the conducting wire of one of the earthings should become interrupted, and that thus the connections will be devoid of tension, and it will not be possible for vessel 1 on which a body fault may possibly have developed, even though the earthing should be defective.

At the same time, pin 14 also makes it easily possible to place vessels of smaller or greater diameter on the place of connection, because the pin 14 will, with the aid of the opening 34 of the lid 16, ensure that the vessel should be placed on the place of connection in a central manner. On Fig. 1 vessels of various diameters have been indicated by dotted lines.

Should it be desired to do without any device for ensuring earthing, the terminal 28 can, instead of being connected to an earthing plate 27, also be connected to the body of the table.

It is also possible, if desired, to fill the space of the heater of the direct-heated cooking vessel 1 with some indifferent gas. It is, however, also sufficient to press the sheets supporting the heater so closely to each other that by these means already any oxidation due to the access of air is diminished to a minimum.

The contacts can be protected against their being touched inadvertently by placing them in a recondite position below the lid of the table.

My experiments have shown that with the above equipment the time of cooking can be reduced by more than one-half and that, for instance, the current consumed for cooking a dinner is less by 40—60% than in the case of a cooking plate.

With regard to its details of construction the invention can be modified in many ways.

What I claim is:—

1. A cooking equipment, comprising a direct electric heated cooking vessel and a cooperating base therefor, with which the said vessel is removably associated, current introduction means for said vessel, a supply circuit including same means, current connection contacts for the vessel provided in said base and adapted to cooperate with the said current introduction means of the vessel when the vessel is positioned on the base, and safety interrupting means in said supply circuit, for maintaining said contacts under tension when the vessel is in its operable position on said base, and for freeing said contacts of tension when the vessel is removed to its inoperable position, away from said base.

2. A cooking equipment according to claim 1, in which the safety interrupting means for freeing the current-admitting contacts of the base of tension comprises a magnetic remote-control switch controlled by placing the cooking vessel on or removing it from said base.

3. A cooking equipment according to claim 1, in which the safety interrupting means for freeing the current-admitting contacts of the base of tension comprises a magnetic remote-control switch controlled by placing the cooking vessel on or removing it from said base, and means providing a voltage sufficiently low to be harmless to the operator, for operating said remote control switch.

4. A cooking equipment according to claim 1, in which the safety interrupting means for freeing the current-admitting contacts of the base of tension comprises a magnetic remote-control switch controlled by placing the cooking vessel on or removing it from said base, said remote control switch containing an operating coil and a circuit for said operating coil, the said circuit being adapted to be closed by the cooking vessel when the latter is in its working position on said base.

5. A cooking equipment according to claim 1, in which the safety interrupting means for freeing the current-admitting contacts of the base of tension comprises a magnetic remote-control switch controlled by placing the cooking vessel on or removing it from said base, and grounding means, one terminal of the low voltage operating circuit of the remote control switch being grounded and the other terminal being connected to the cooking equipment, whereby the operating circuit of the remote control switch can be closed partly through the cooking vessel and partly through earth.

6. A cooking vessel for cooking equipment according to claim 1, comprising a cap secured tightly onto the bottom rim of said vessel, and provided with perforations, and insulated current conducting means provided in said perforations, and connected to said current introduction means for said vessel.

7. A cooking vessel for cooking equipment according to claim 1, comprising a cap secured tightly onto the bottom rim of said vessel, and provided with perforations, and insulating current conducting means provided in said perforations, and connected to said current introduction means for said vessel, bushing protruding from or secured to the bottom of the vessel, and insulators and contacts tightly enclosed in said bushings.

ERNEST REICH.